United States Patent [19]
Lambie et al.

[11] Patent Number: 4,920,217
[45] Date of Patent: Apr. 24, 1990

[54] PRODUCTION OF DIMETHYLAMINOMETHYL COPPER PHTHALOCYANINE

[75] Inventors: Ian A. Lambie, Glasgow; Paul I. W. Yarrow, Paisley; Robert Langley, Glasgow; Colin D. Campbell, Beith, all of Scotland

[73] Assignee: Ciba-Geigy Corporation, Ardsley, N.Y.

[21] Appl. No.: 245,490

[22] Filed: Sep. 19, 1988

[30] Foreign Application Priority Data
Oct. 3, 1987 [GB] United Kingdom ............... 8723258

[51] Int. Cl.$^5$ ............................................. C09B 47/16
[52] U.S. Cl. ................................................. 540/135
[58] Field of Search ........................................ 540/135

[56] References Cited
U.S. PATENT DOCUMENTS
4,810,297  3/1989  Takei et al. ..................... 106/186

FOREIGN PATENT DOCUMENTS
724212  2/1955  United Kingdom .
2184744  7/1987  United Kingdom .

Primary Examiner—Richard L. Raymond
Attorney, Agent, or Firm—Stephen V. O'Brien

[57] ABSTRACT

The present invention provides a process for the production of dimethylaminomethyl copper phthalocyanine having an average of 1 to 4 dimethylaminomethyl groups per molecule which comprises reacting aminomethyl copper phthalocyanine having an average of 1 to 4 aminomethyl groups per molecule with formaldehyde and aqueous formic acid at a concentration of 2 to 60%, at atmospheric pressure, and at an elevated temperature.

4 Claims, No Drawings

PRODUCTION OF DIMETHYLAMINOMETHYL COPPER PHTHALOCYANINE

The present invention relates to the production of dimethylaminomethyl copper phthalocyanine, which is used to improve the performance of copper phthalocyanine pigments in ink, paint and plastics media.

This is a known compound and is prepared by reacting aminomethyl copper phthalocyanine with formic acid and formaldehyde according to the reaction:

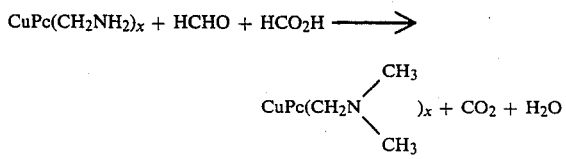

where CuPc is copper phthalocyanine and x has an average value from 1 to 4. Usually mixtures of products having different values of x are produced. All the prior art processes suggest that, to produce an additive of acceptable quality, it is necessary to use either concentrated formic acid at atmospheric pressure or dilute formic acid at elevated pressure—see for instance GB 724212 and GB 2184744.

We have now surprisingly found that the reaction can be carried out using dilute formic acid at atmospheric pressure, and the resulting product is as good as the prior art product when used with copper phthalocyanine pigments. This process combines the cost-effective use of dilute formic acid with safe working procedures at atmospheric pressure. Also there is no need for specialist equipment which is needed for processes carried out at elevated pressure.

Accordingly the present invention provides a process for the production of dimethylaminomethyl copper phthalocyanine having an average of 1 to 4 dimethylaminomethyl groups per molecule which comprises reacting aminomethyl cooper phthalocyanine having an average of 1 to 4 aminomethyl groups per molecules with formaldehyde and aqueous formic acid at a concentration of 2 to 60%, at atmospheric pressure and at an elevated temperature.

The concentration of formic acid is preferably from 5 to 25%.

The reaction temperature is preferably from 80° to 110° C.

The reaction product may contain small amounts of monomethylated product as well as some unchanged starting material, but their presence has no detrimental effect on the performance of the product and there is no need to separate the dimethyl product from these other compounds before use.

We prefer to have an average of about 2.5 dimethylaminomethyl groups per molecule.

The starting material, aminomethyl cooper phthalocyanine may be prepared in known manner be subjecting the corresponding phthalimidomethyl copper phthalocyanine to alkaline hydrolysis, followed by acid hydrolysis. The resulting product usually contains some re-formed starting material. A method which does not leave starting material is to subject the phthalimidomethyl copper phthalocyanine to hydrazinolysis using 5 to 15% aqueous hydrazine hydrate at reflux.

The invention is illustrated by the following Examples.

EXAMPLE 1

(a) Preparation of Aminomethyl copper phthalocyanine.

34g 100% Phthalimidomethyl copper phthalocyanine (containing about 2.5 phthalimidomethyl groups per copper phthalocyanine molecule) as filtercake is slurred in 100g water at 90° C. When a smooth lump-free paste is obtained, 15g 98–100% hydrazine hydrate is added and the mixture refluxed with stirring in an oil bath maintained at 130° C. for 8 hrs. Heating is removed, the mixture diluted with water and the pH adjusted to 9.0 with ammonia solution (0.88 Specific Gravity). The product is filtered and washed with 1% aqueous ammonia. If desired the aminomethyl copper phthalocyanine may be dried at 60° C.

(b) 100g of a presscake (containing 27% solids) of aminomethyl copper phthalocyanine (containing 2.5 aminomethyl groups per copper phthalocyanine molecule) is mixed with 80g 98% formic acid and 187g water at 90° C. and stirred until homogeneous. 18g 40% aqueous formaldehyde is added. This mixture represents a 22.4% w/w formic acid solution. The mixture is heated at 95° C. for 6 hrs, then poured into 500 ml cold water, made up to 1 litre with cold water and the pH is adjusted to 8.0 with ammonia solution (0.88 SG). The product is filtered and washed with 5 litres cold water containing 0.1% ammonia and dried at 60° C.

Yield: 27.1 g.

EXAMPLE 2

100g of a presscake (containing 27% solids) of aminomethyl copper phthalocyanine (containing 2.5 aminomethyl groups per copper phthalocyanine molecule) is mixed with 27g 98% formic acid and 240g water at 90° C. and stirred until homogeneous. 18g 405 aqueous formaldehyde is added. This mixture represents a 7.5% w/W formic acid solution. The mixture is heated at 95° C. for 6 hrs, poured into 500 ml cold water, made up to 1 litre with cold water and the pH is adjusted to 8.0 with ammonia solution (0.88 SG). The product is filtered and washed with 5 litres cold water containing 0.1% ammonia and dried at 60° C.

Yield: 25 g.

EXAMPLE 3

100g of a presscake (containing 27% solids) of aminomethyl copper phthalocyanine (containing 2.5 aminomethyl groups per copper phthalocyanine molecule) is mixed with 267g 98% formic acid and the mixture stirred at 90° C. until homogeneous. 18g 40% aqueous formaldehyde is added. This mixture represents a 74.6% w/w formic acid solution. The mixture is heated at 95° C. for 6 hrs, poured into 500 ml cold water, made up to 1 litre with cold water and the pH is adjusted to 8.0 with ammonia solution (0.88 SG). The product is filtered and washed with 5 litres cold water containing 0.1% ammonia and dreid at 60° C.

Yield: 26 g.

EXAMPLE 4

Three inks are made up as follows.

A mixture of 66.5g crude copper phthalocyanine, 1.7g chlorinated copper phthalocyanine (Cl=8%) and 3.4g of the product obtained in Example 1, 2 or 3 (5% of mixture) were ball-milled together for 3.5 hr.

12g of this pigment mixture, 48g phenolic medium (Alsynol RL30—modified phenolic resin/toluene 50/50), 40g toluene and 200g. 10 mm steatite balls were milled for 16 hrs at 20° C. in a glass jar rotated at 115 rpm. The millbase (25g) was let down to the final ink by mixing well with phenolic medium (20g) and toluene (5g).

The yield of ink from the ballmill, the ink flow properties, and the colouristic properties are, within experimental error, the same in each case. This shows that the product made using dilute formic acid at atmospheric pressure is as good as that made using concentrated formic acid.

We claim:

1. A process for the production of dimethylaminomethyl copper phthalocyanine having an average of 1 to 4 dimethylaminomethyl groups per molecule which comprises reacting aminomethyl copper phthalocyanine having an average of 1 to 4 aminomethyl groups per molecule with formaldehyde and aqueous formic acid at a concentration of 5 to 25%, at atmospheric pressure, and at an elevated temperature.

2. A process as claimed in claim 1 in which the product has an average of about 2.5 dimethylaminomethyl groups per molecule.

3. A process as claimed in claim 1 in which the reaction temperature is from 80 to 110° C.

4. A process as claimed in claim 1 in which the aminomethyl copper phthalocyanine is obtained from phthalimidomethyl copper phthalocyanine by hydrazinolysis using 5 to 15% aqueous hydrazine hydrate at reflux.

* * * * *